Aug. 19, 1941.  A. W. SVENSSON  2,253,354

REPLACEABLE FACING FOR TRIMMER GAUGES

Filed Sept. 27, 1940

INVENTOR.
ALBERT WILLIAM SVENSSON.
BY Warren E. Willis.

Patented Aug. 19, 1941

2,253,354

UNITED STATES PATENT OFFICE 2,253,354

REPLACEABLE FACING FOR TRIMMER GAUGES

Albert William Svensson, Flushing, N. Y.

Application September 27, 1940, Serial No. 358,651

5 Claims. (Cl. 29—69)

This invention relates to printers' circular saws and is an improvement on the present methods of resetting a saw gauge, when necessary, because of the replacement of a dull blade by a new or resharpened one, as the teeth of saws vary in thickness due to hand "setting."

Resetting the gauge, at the present time, is an operation accomplished by hand, and, if it is to be performed accurately, must be done by a person who is accustomed to the use of a micrometer, and who has the patience to test the setting several times in order to set it as near perfect as possible.

A person unfamiliar with micrometers or who has no mechanical ability whatever, can, by using my invention, set a saw gauge as nearly perfect as the construction of the machine itself will allow.

This and other objects are accomplished by the novel construction and combination of parts hereinafter described and illustrated in the accompanying drawing, constituting a component of this disclosure, and in which.

Figure 1:
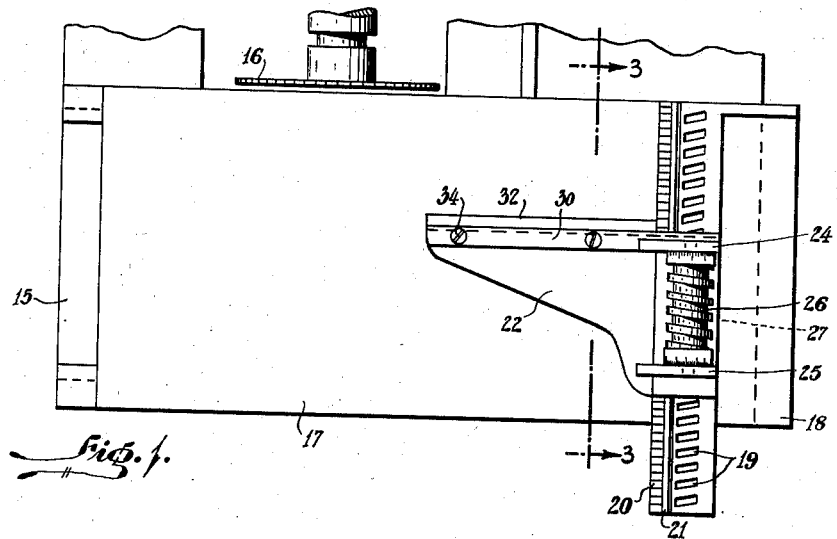
Figure 1 is a partial top plan view of a conventional printers' saw table, showing the application of an embodiment of the invention.

Referring to the drawing, the numeral 15 designates in general a conventional type of printers' saw bench, and 16 a portion of a circular cutter protruding thereabove.

Slidably mounted on the bench is a table 17 movable at a right angle to the axis of the cutter 16 and provided with means for taking up wear, as the gib and screws shown.

A guide block 18 is fixed transversely on the rear margin of the table 17, adjacently in front of which is a rack 19, forwardly of which, in its front portion is a longitudinal groove 21, while further to the front is a scale 20.

The table presents a level surface on which normally rests an arm 22 provided with a guide rib 23 slidably fitting the groove 21, the arm being movable over the table and having at its rear two raised, spaced bearing supports 24—25 to slide over the rack and scale.

A manually operable worm 26 is rotatably mounted on a spindle 27 removably carried in the supports 24—25, between which the worm is accurately fitted, the worm being engageable with the teeth of the rack 19 when the arm is in operative position on the table and is micrometrically adjustable for normal cutting and mitering.

It will be understood that the pitch of the worm and rack are in definite relation to the scale 20, while the hubs of the worm are provided with adjustable collars 28—29 held by set screws, and having fine graduations of the printer's scale, i. e. "point system," by which the distance moved by the arm 22, by coaction of the worm and rack, are accurately calibrated.

Figures 4, 5:
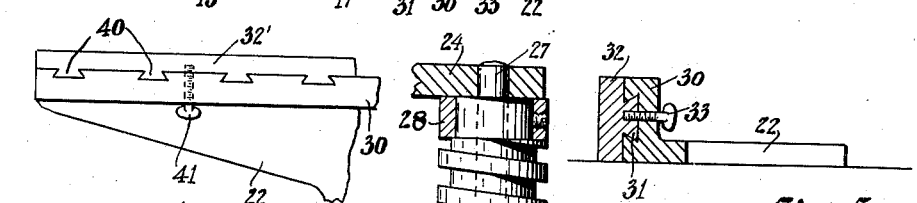
Figure 4 is a fragmentary view showing a modification.
Figure 5 is a partial sectional, partial elevational view of a further modification of the device.
Figure 6:
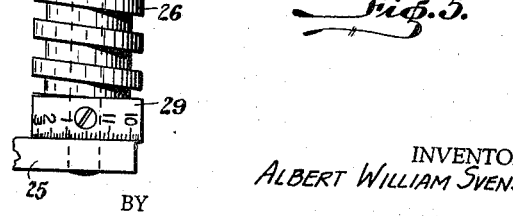
Figure 6 is an enlarged view of the worm and dials.

The arm 22 has on its face, opposed to the saw, a raised ledge 30 in which is a longitudinal channel preferably dove-tailed as shown, the channel being receptive of a corresponding tenon 31 on the adjacent side edge of a soft metal facing 32, that can be cut by the saw blade or trimmer knives, and which is thus held firmly therein, but may be replaced by another when it becomes necessary to reset the gauge; means as the screw 33 being provided to clamp the facing 32 securely to the arm, as shown in Figure 5.

Figure 2:
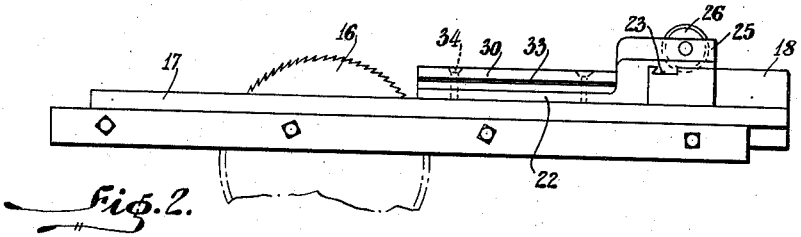
Figure 2 is an outer side elevational view of the same.
Figure 3:
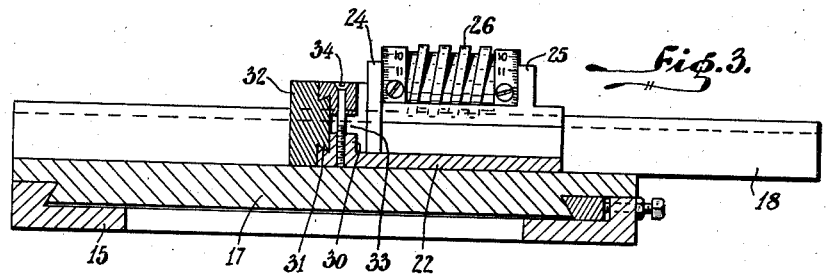
Figure 3 is a transverse sectional view taken on line 3—3 of Figure 1, drawn to an enlarged scale.

In Figures 1, 2 and 3, the ledge 30 is split lengthwise in a horizontal plane, as at 33, and provided with clamp screws 34, thus holding the soft facing 32 securely.

Figure 4 shows a series of dove-tail elements 40 on the facing 32', received in corresponding vertical recesses in the ledge 30; in Figure 4, a pin or screw 41 may be used to prevent the facing from rising relative to the ledge.

In operation, the arm 22 is moved to cause the facing 32 to extend slightly into the path of the cutter 16; then the dial or the worm is set to cipher whereupon the table is moved forwardly, so that a thin shaving is taken off the front of the facing.

Thereafter the arm 22 is moved away from the saw or cutter so as to carry the facing approximately the required distance, then accurately set, by the worm and scale, the exact distance from the saw that is required for the work part to be cut.

As an example, in setting the gauge by hand if the gauge should be set to 6 picas (.996"), and the material cut should measure .002 oversize, the worm is turned to move the gauge closer .002 to the cutting tool, a move which is so slight, that there is a great possibility of moving up too much or not enough; then the adjustable dial collars 28 or 29 are loosened by releasing the set screw, then turned to cipher, clamped, another piece of material cut, measured, and the process repeated until the material cut is as near to micrometric exactness as possible.

My invention eliminates all this troublesome, costly labor; the leading edge on the ledge of the arm 22 is made with a dove-tail groove while the facing 32, made of a soft material that can be cut by the cutting tool, has a dove-tail tenon to fit into the dove-tail groove of the ledge. These elements are made in such manner that when the gauge is set at cipher on the scale and cipher on the worm, the facing or leading edge 32 can be adjusted to protrude into the path of the cutting tool.

When the sliding table is moved past the cutting tool, a very narrow portion of the soft facing is cut away, setting the gauge as close to micrometric exactness as the construction of the gauge and machine itself will allow.

When repeatedly changing the cutting tool, it is not necessary to replace the soft leading edge each time; the scale may be moved up to a "point" or so, so that the facing is again in the path of the cutting tool, the collar set back to cipher, and the gauge again used. In this way, the same facing may be used for a number of settings.

The foregoing is to be regarded as descriptive, rather than limitative of the invention, which may be modified in minor matters such as may come within the purview of the appended claims.

Having thus described the invention including the manner of its construction and application, what is claimed as new and sought to secure by Letters Patent, is:

1. In a printer's circular saw gauge, a bench, a table guided to move on the bench past and closely adjacent the side of the saw and having guide means at its rear at a right angle to the table movement, a rack fixed on said table parallel to said guide means, a scale adjacent the rack, an arm having a rib slidable in the guide means, said arm having bearings at its rear edge and a raised ledge on its face parallel with the face of the cutter, said ledge being formed of spaced upper and lower sections constituting jaws, a worm journalled between the inner proximate ends of said bearings to engage the rack, said worm having hubs, adjustable collars carrying micrometric graduations on said hubs, means to secure said collars in adjustment on the hubs, and a soft reducible facing removably engaged between said jaws on the face of said ledge, said facing adapted to be cut by direct contact with the teeth of the saw.

2. In a bench cutter gauge, a table slidable longitudinally over the bench, means to guide said table in a straight path, an arm mounted on said table, a rack fixed on said table, a worm engageable in said rack, said worm rotatably mounted in said arm, a work support ledge combined with said arm, and a soft facing interengageably connected with said ledge adapted to be cut by contact with the cutter.

3. A cutter gauge having a renewable facing adapted for repeated reduction by intentional abrasive contact with the cutter, slidable interengaging means connecting said facing and gauge, and micrometic worm and rack means to adjust said gauge.

4. A cutter gauge having a renewable facing adapted for repeated reduction by abrasive contact with the cutter, and means to retain the facing on the gauge.

5. A cutter gauge having a renewable facing adapted for repeated reduction by abrasive contact with the cutter.

ALBERT WILLIAM SVENSSON.